United States Patent
Yasuhara

(10) Patent No.: US 8,038,561 B2
(45) Date of Patent: Oct. 18, 2011

(54) POWER TRANSMISSION CHAIN, AND POWER TRANSMISSION SYSTEM HAVING THE SAME

(75) Inventor: Shinji Yasuhara, Yamatokoriyama (JP)

(73) Assignee: JTEKT Corporation, Osaka-shi, Osaka (JP)

(*) Notice: Subject to any disclaimer, the term of this patent is extended or adjusted under 35 U.S.C. 154(b) by 40 days.

(21) Appl. No.: 11/727,829

(22) Filed: Mar. 28, 2007

(65) Prior Publication Data

US 2007/0232430 A1 Oct. 4, 2007

(30) Foreign Application Priority Data

Mar. 30, 2006 (JP) .................. P2006-095410

(51) Int. Cl.
*F16G 5/16* (2006.01)
*F16G 13/04* (2006.01)
*F16G 1/21* (2006.01)

(52) U.S. Cl. .............. 474/245; 474/242; 474/215

(58) Field of Classification Search .......... 474/215, 474/242, 245, 210, 211, 212
See application file for complete search history.

(56) References Cited

U.S. PATENT DOCUMENTS

| | | | |
|---|---|---|---|
| 5,242,334 A * | 9/1993 | Sugimoto et al. | 474/215 |
| 6,406,396 B1 * | 6/2002 | Turner | 474/242 |
| 6,527,657 B2 * | 3/2003 | Sakakibara | 474/245 |
| 7,048,665 B2 * | 5/2006 | Ledvina et al. | 474/212 |
| 2003/0236145 A1 * | 12/2003 | Ledvina et al. | 474/215 |
| 2005/0187057 A1 * | 8/2005 | Lou | 474/245 |
| 2007/0149331 A1 * | 6/2007 | Yasuhara et al. | 474/215 |
| 2007/0149332 A1 * | 6/2007 | Kamamoto et al. | 474/229 |
| 2007/0191166 A1 * | 8/2007 | Yasuhara et al. | 474/245 |
| 2007/0238566 A1 * | 10/2007 | Miura | 474/245 |
| 2008/0161148 A1 * | 7/2008 | Tada et al. | 474/245 |

FOREIGN PATENT DOCUMENTS

| | | |
|---|---|---|
| EP | 1 482 206 A2 | 12/2004 |
| EP | 1760361 A1 | 3/2007 |
| JP | 63-3545 | 1/1988 |
| JP | 8-312725 | 11/1996 |
| JP | 2005-114133 | 4/2005 |
| JP | 2005-214323 | 8/2005 |
| JP | 2005-214345 | 8/2005 |

(Continued)

OTHER PUBLICATIONS

European Search Report issued in EP Application No. 07006351.6 dated Sep. 2, 2010.
European Patent Office Communication dated Aug. 10, 2011.

*Primary Examiner* — Michael Mansen
*Assistant Examiner* — Robert Reese
(74) *Attorney, Agent, or Firm* — McGinn Intellectual Property Law Group, PLLC

(57) ABSTRACT

A chain is provided with a plurality of links, and connecting members for connecting those links such that the links are relatively bendable to each other. A first pin of the connecting member is clamped between pulleys thereby to transmit the power between itself and said pulleys. The chain includes a central area with respect to chain width directions, and side areas located on the sides of the central area. In the central area, links adjoining in the chain width directions are pushed to contact with each other, and rotate relative to each other while exerting frictional forces on each other as the chain is bent. In each of the side areas, the links adjoining in the chain width directions are arrayed through a predetermined clearance.

17 Claims, 7 Drawing Sheets

FOREIGN PATENT DOCUMENTS

| | | |
|---|---|---|
| JP | 2005-315341 | 11/2005 |
| JP | 2006-77847 | 3/2006 |
| WO | WO2005073594 A1 * | 8/2005 |
| WO | WO 2005/108819 A1 | 11/2005 |

* cited by examiner

POWER TRANSMISSION CHAIN, AND POWER TRANSMISSION SYSTEM HAVING THE SAME

BACKGROUND OF THE INVENTION

1. Field of the Invention

The present invention relates to a power transmission chain and a power transmission system provided with the chain.

2. Related Art

An endless power transmission chain to be used in a power transmission system such as a pulley type continuously variable transmission (CVT) of an automobile is provided with a plurality of links, and pins connecting those links, so that the paired end faces of the pins individually engage with the taper disks of pulleys thereby to transmit the power between themselves and the pulleys (as referred to JP-A-2005-214323 and JP-A-2005-214345, for example).

In the power transmission chain of JP-A-2005-214323, with the links being superposed in the thickness direction, pins are press-fitted in the pinholes of those links, and the links arranged to adjoin each other are bendably connected to each other. These adjoining links make frictional contact at their side faces with each other. These side faces of the links are covered with such a coating material as can be worn or peeled as the chain is used. As the coating material is worn or peeled, the contacting facial pressure between the side faces is lowered to reduce the bending torque at the bending time.

In the power transmission chain of JP-A-2005-214345, clearances are formed between the links adjoining in the chain width directions so that the links may not come into frictional contact. As a result, the bending torque at the bending time is reduced.

The aforementioned power transmission chain can effectively suppress the chord vibrations, which might otherwise be made in the chain radial direction in the areas in front of and at the back of the pins are bitten into the pulleys. However, the chord vibrations may occur according to the moving conditions. In this case, the pins are impulsively brought into contact with the pulleys to cause noises or the wears of pin end faces undesirably. Especially if the frequency of the chord vibrations coincides with the natural frequency of the power transmission chain, the amplitude becomes undesirably large.

In JP-A-2005-214323 and JP-A-2005-214345, however, the bending torque of the power transmission chain is reduced to have a low resistance to the damping of the chord vibrations so that the chord vibrations are hard to suppress once they occur. It is conceivable to attenuate the chord vibrations of the power transmission chain by the contact frictions caused when the links adjoining in the chain width directions are brought into contact. If the links are merely brought into the frictional contact, however, the loss at the bending time is increased to drop the transmission efficiency drastically.

The present invention has been conceived on the background thus far described, and has an object to provide a power transmission chain excellent in a vibration suppressing effect and satisfactory in transmission efficiency, and a power transmission system provided with that power transmission chain.

SUMMARY OF THE INVENTION

In order to achieve the aforementioned object, according to the invention, there is provided a power transmission chain including:

a plurality of links arranged in a chain advancing direction; and connecting members extending in a chain width direction perpendicular to the chain advancing direction, for connecting the plural links such that the links are relatively bendable to each other;

wherein the connecting members include power transmission parts having pulley engaging power transmitting portions individually at a pair of end portions;

the plural links include at least two pressure contact links contacting with each other so as to be mutually pressed in the chain width direction; and the at least two pressure contact links are selectively arranged in a predetermined area containing a center of the power transmission chain with respect to the chain width direction, so that the two pressure contact links are relatively rotated while exerting a frictional force on each other as the power transmission chain is bent.

According to the invention, the frictional resistance between the links pressed to contact acts as the damping force at the time of vibrations of the power transmission chain thereby to suppress the vibrations reliably. As a result, the power transmission parts can be prevented from impactive contact with the pulleys thereby to improve the quietness and the durability. Moreover, the frictional resistance is caused only in some of the links so that the drive loss is small. Moreover, the power transmission parts, as clamped in engagement with the pulleys, receive the pushing forces of the pulleys from the two end portions, and are bent so that the two end portions are seriously warped. However, the links pushed to contact with each other are selectively disposed at the predetermined area, in which the pressure transmission members are less warped. As a result, it is possible to prevent the links pushed to contact from having their relative positions accidentally fluctuated to excessively contact with each other thereby to prevent the frictional resistances between those links from becoming excessively high. The drive loss can be reliably reduced to achieve high transmission efficiency.

According to the invention, the connecting members may include a first power transmission part having a pulley engaging power transmitting portions individually at a pair of end portions, and a second power transmission part paired with the first power transmission part; and each of the links includes first and second through holes arranged in the chain advancing direction;

in one of the first and second through holes of each of the links, the corresponding first power transmission part is so fitted as can relatively move, and the corresponding second power transmission part is so fitted as is restricted in the relative movement; and in the other of the first and second through holes of each of the links, the corresponding first power transmission part is so fitted as is restricted in the relative movement, and the corresponding second power transmission part is so fitted as can relatively move.

In this case, the links are fixed in the corresponding first and second power transmission parts so that they can be positioned in the chain width directions. As a result, the links can be reliably pushed to contact with each other.

According to the invention, there may be provided a power transmission system may include: first and second pulleys individually including a plurality of conical sheave faces confronting each other; and the aforementioned power transmission chain looped between the pulleys and engaging with the sheave faces for transmitting a power. In this case, it is possible to realize the continuously variable transmission, which is excellent in quietness, durability and transmission efficiency.

DETAILED DESCRIPTION OF THE PREFERRED EMBODIMENTS

A preferred mode of embodiment of the invention is described with reference to the accompanying drawings.

Figure 1:
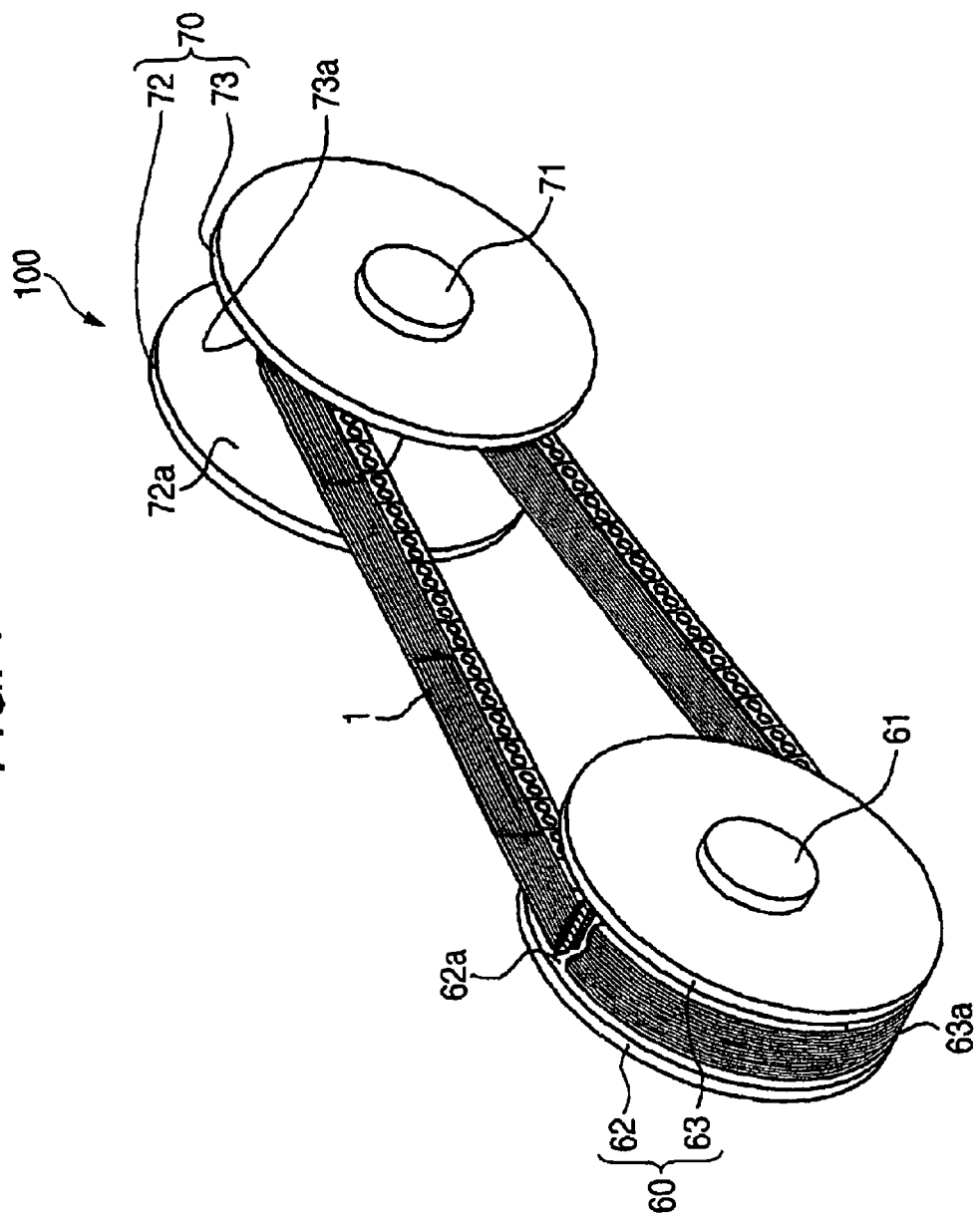
FIG. 1 is a perspective view schematically showing a constitution of an essential portion of a chain type continuously variable transmission acting as a power transmission system, which is provided with a power transmission chain according to one mode of embodiment of the invention.

FIG. 1 is a perspective view schematically showing a constitution of an essential portion of a chain type continuously variable transmission (as will be shortly referred to as the "continuously variable transmission") acting as a power transmission system, which is provided with a power transmission chain according to one mode of embodiment of the invention. With reference to FIG. 1, a continuously variable transmission 100 is mounted on a vehicle such as an automobile, and is provided with: a drive pulley 60 made of a metal (e.g., structural steel) as a first pulley; a driven pulley 70 made of a metal (e.g., structural steel) as a second pulley; and an endless power transmission chain 1 (as will be shortly referred to as the "chain") looped between those two pulleys 60 and 70. Here, the chain 1 is presented partially in section in FIG. 1 so that it may be easily understood.

Figure 2:
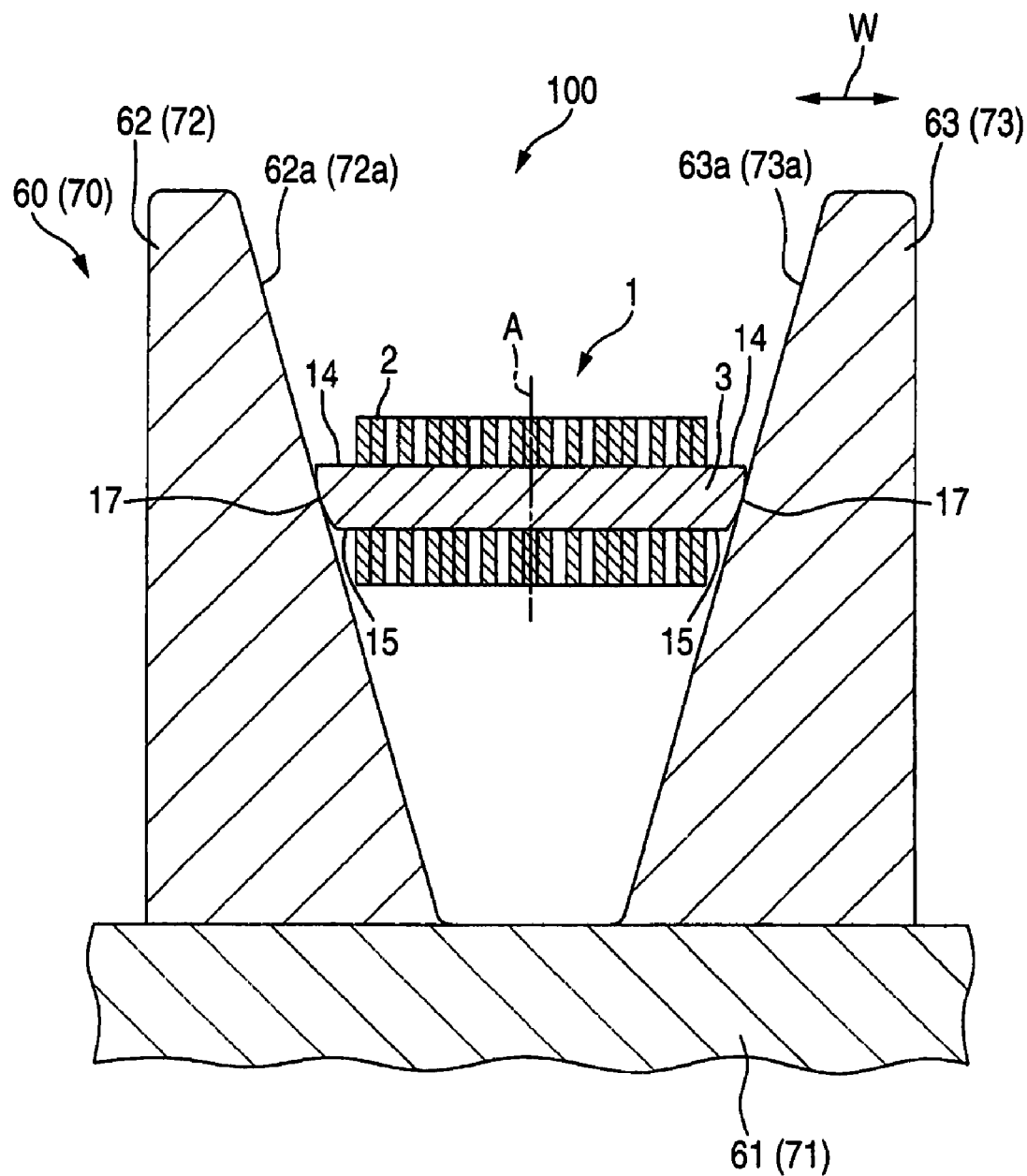
FIG. 2 is an enlarged section of a portion of a drive pulley (or a driven pulley) and a chain 1 of FIG. 1.

FIG. 2 is an enlarged section of a portion of the drive pulley 60 (or the driven pulley 70) and the chain 1 of FIG. 1. With reference to FIG. 1 and FIG. 2, the drive pulley 60 is rotatably mounted integrally with an input shaft 61 leading in a power transmitting manner to the drive source of the vehicle, and is provided with a stationary sheave 62 and a moving sheave 63. These stationary sheave 62 and moving sheave 63 are provided with a pair of confronting sheave faces 62a and 63a, respectively. These individual sheave faces 62a and 63a have conical slopes. These sheave faces 62a and 63a define a groove inbetween for clamping and holding the chain 1 under a strong pressure.

Moreover, a (not-shown) hydraulic actuator for changing the groove width is connected to the moving sheave 63. At a speed changing time, the moving sheave 63 is moved in the axial direction (or to the right or left of FIG. 2) of the input shaft 61 thereby to vary the groove width. As a result, the chain 1 is moved in the radial direction (or upward or downward of FIG. 2) of the input shaft 61 thereby to change the effective radius (as will also be called the "effective radius" of the pulley 60) of the pulley 60 for the chain 1.

As shown in FIG. 1 and FIG. 2, on the other hand, the driven pulley 70 is rotatably mounted integrally with an output shaft 71 leading in a power transmitting manner to the drive wheel (although not shown). Like the drive pulley 60, the driven pulley 70 is provided with a stationary sheave 73 and a moving sheave 72, which are provided with a pair of confronting sheave faces 73a and 72a, respectively, for moving a groove to clamp the chain 1 under a strong pressure.

Like the moving sheave 63 of the drive pulley 60, the moving sheave 72 of the driven pulley 70 is connected to the hydraulic actuator (although not shown). At a speed changing time, the moving sheave 72 is moved to vary the groove width. As a result, the chain 1 is moved to change the effective radius (as will also be called the "effective radius" of the pulley 70) of the pulley 70 for the chain 1.

Figure 3:
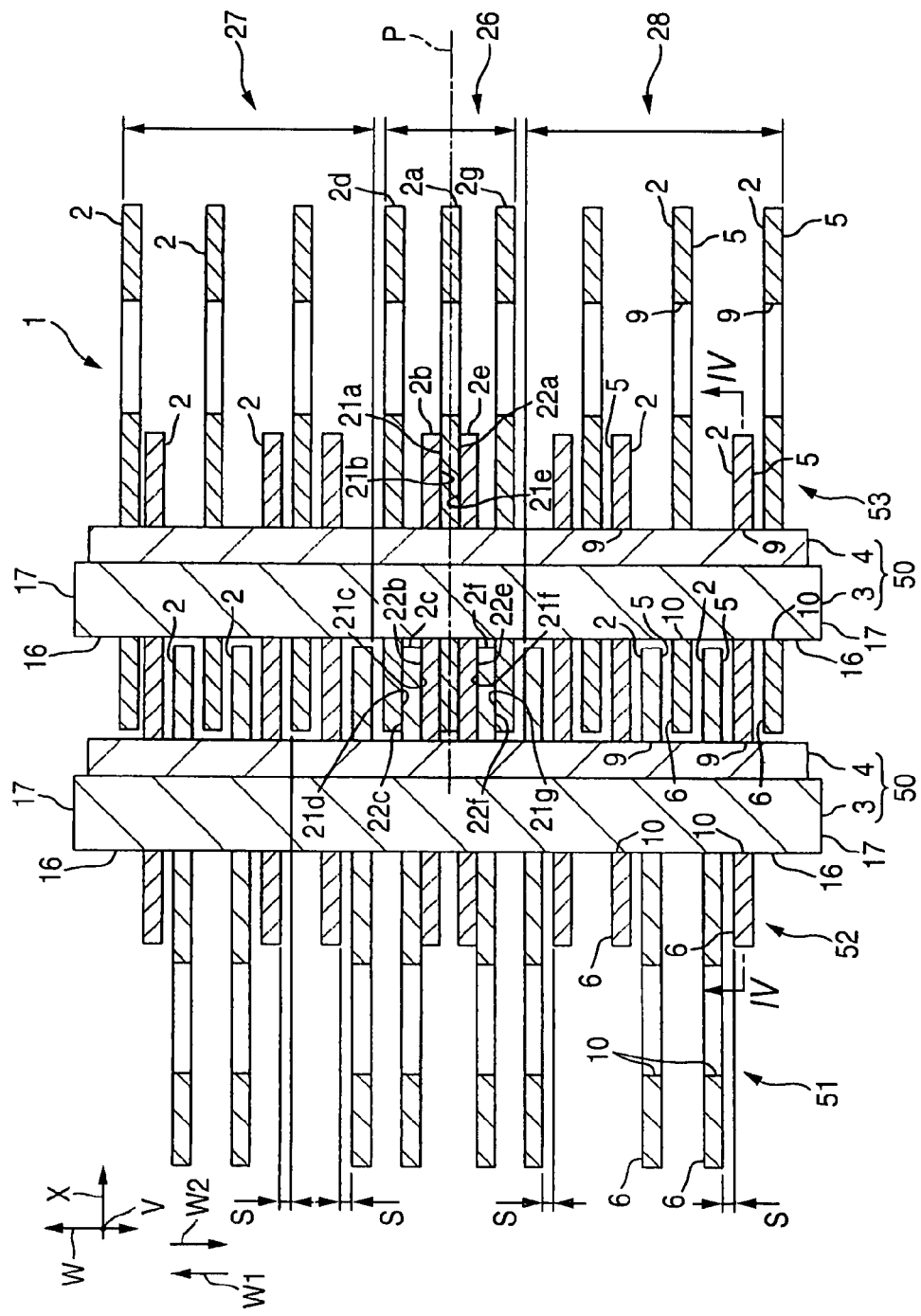
FIG. 3 is a section of an essential portion of the chain.
Figure 4:
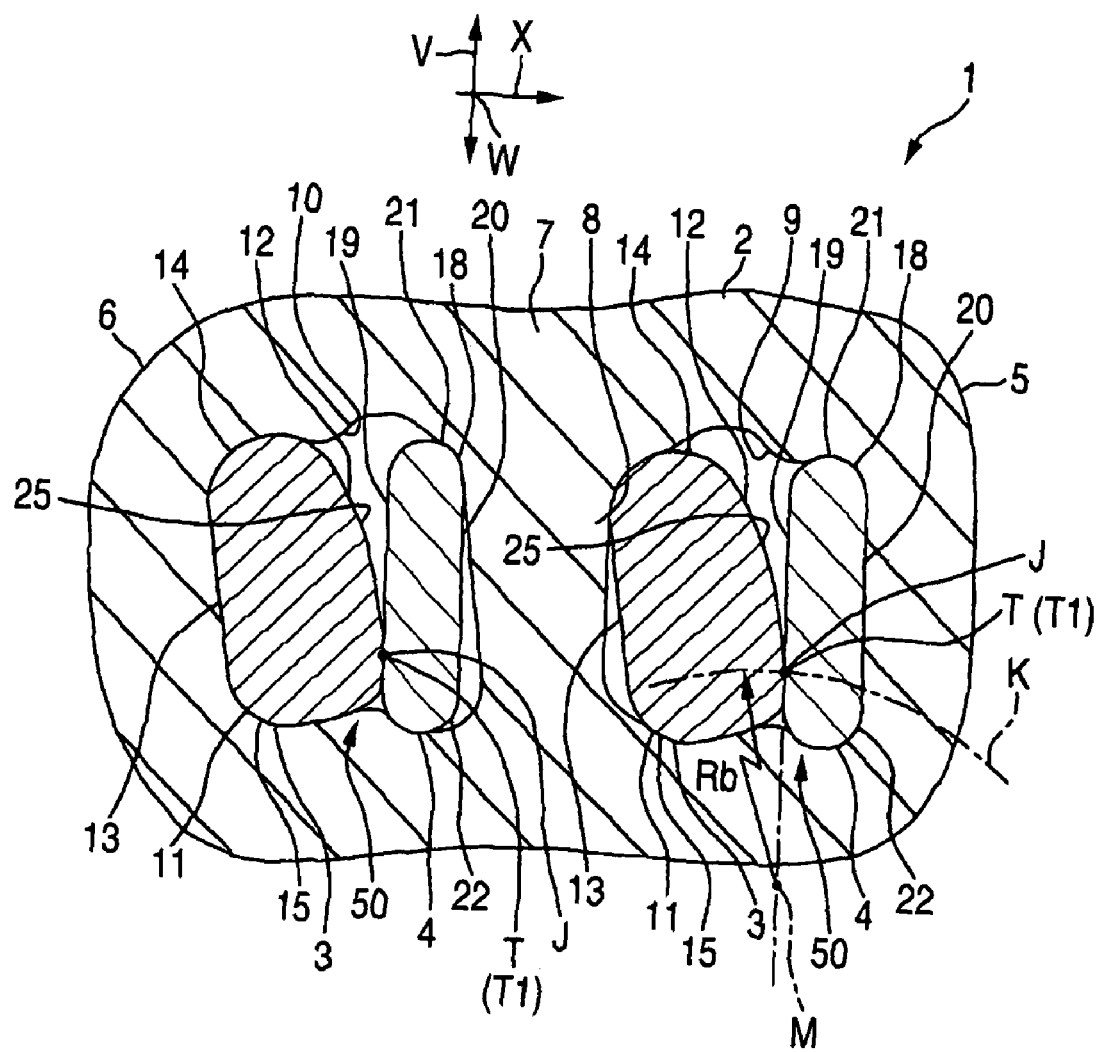
FIG. 4 is a section taken along line IV-IV of FIG. 3, and shows a straight area of the chain.
Figure 5:
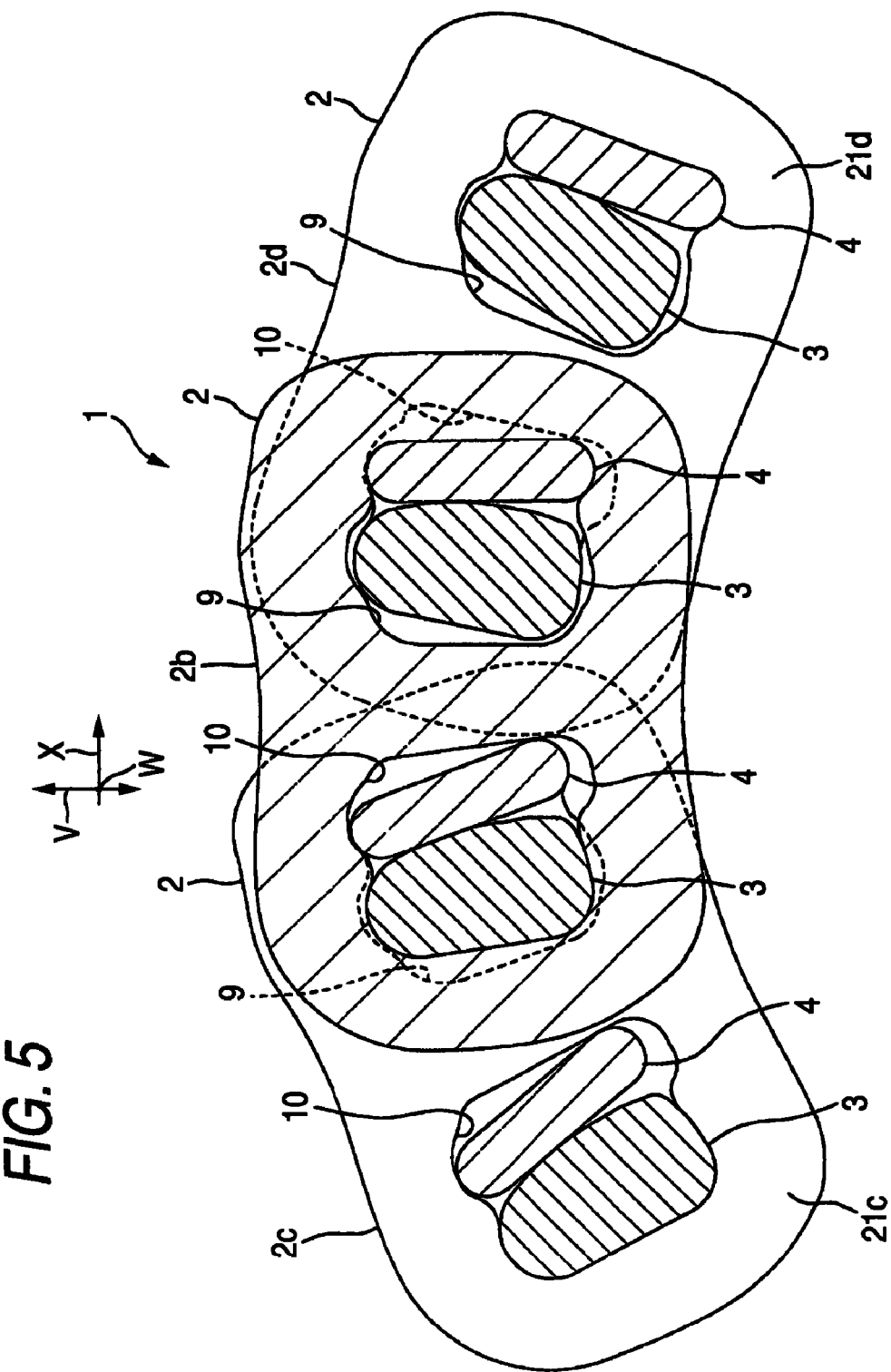
FIG. 5 is a section of a bent area of the chain.

FIG. 3 is a section of an essential portion of the chain 1. FIG. 4 is a section taken along line IV-IV of FIG. 3, and shows a straight area of the chain 1. FIG. 5 is a section of a bent area of the chain 1.

In the following, the description referring to FIG. 4 is made with reference to the straight area of the chain 1, and the description referring to FIG. 5 is made with reference to the bent area of the chain 1.

With reference to FIG. 3 and FIG. 4, the chain 1 is provided with a plurality of links 2, and a plurality of connecting members 50 for connecting those links 2 in a mutually bendable manner. The chain 1 is fed with lubricating oil so that it is lubricated and cooled.

In the following: the direction along the advancing direction of the chain 1 will be called as a "chain advancing direction X"; the directions perpendicular to the chain advancing direction X and along the longitudinal direction of the connecting members 50 will be called the "chain width directions W"; and the direction perpendicular to both the chain advancing direction X and the chain width directions W will be called the "chain radial direction V".

Each link 2 is formed into a plate shape, which includes a front end portion (leading end portion) 5 and a rear end portion (trailing end portion) 6 or a pair of end portions arrayed at the front and rear of the chain advancing direction X, and an intermediate portion 7 arranged between those front end portion 5 and rear end portion 6.

In the front end portion 5 and the rear end portion 6, respectively, there are formed a front through hole (leading through hole) 9 acting as a first through hole and a rear through hole (trailing through hole) 10 acting as a second through hole. The intermediate portion 7 is provided with a pillar portion 8 for partitioning the front through hole 9 and the rear through hole 10. The pillar portion 8 has a predetermined thickness in the chain advancing direction X. The outer peripheral edge of each link 2, the peripheral edge of the front through hole 9 and the peripheral edge of the rear through hole 10 are individually formed into such smooth curves as hardly cause the stress concentration.

First to third link rows 51 to 53 are formed of the links 2. Specifically, the first link row 51, the second link row 52 and the third link row 53 individually contain the plural links 2 arrayed in the chain width directions W. Individually in the first to third link rows 51 to 53, the links 2 of a common link row are arranged at the identical positions of the chain advancing direction X. The first to third link rows 51 to 53 are arranged along the chain advancing direction X.

The first link row 51 includes eight sheets of links 2, for example. The second link row 52 includes eight sheets of links 2, for example. The third link row 53 includes nine sheets of links 2, for example. The individual links 2 of the first to third link rows 51 to 53 are so arrayed that the links of the common link row may not continue in the chain width directions W.

In each of the link rows 51 to 53, the links 2 are symmetrically arrayed with respect to such a center plane P or the center of the chain 1 as is perpendicular to the chain width directions W and as extends through the center of the chain width directions W. Specifically, no matter whether in one direction W1 or in the other direction W2 of the chain width directions W with respect to the link 2a of the third link row 53 in the center plane P, there are arrayed, sequentially in the recited order, the link 2 of the second link row 52, the link 2 in the first link row 51, the link 2 in the third link row 53, the link 2 in the first train 5.1, the link 2 in the second train 52, the link 2 in the third train 53, the link 2 in the second train 52, the link 2 in the first train 51, the link 2 in the third train 53, the link 2 in the first train 51, the link 2 in the second train 52, and the link 2 in the third train 53.

The links 2 of the first to third link rows 51 to 53 are connected relatively rotatably (or bendably) to the links 2 of the corresponding first to third link rows 51 to 53 by using the corresponding connecting members 50.

Specifically, the front through holes 9 of the links 2 of the first link row 51 and the rear through holes 10 of the links 2 of the second link row 52 are so arranged in the chain width directions W as to correspond to each other, and the links 2 of the first and second link rows 51 and 52 are so connected to each other by the connecting members 50 inserted in those through holes 9 and 10 as can be bent in the chain advancing direction X.

Likewise, the front through holes 9 of the links 2 of the second link row 52 and the rear through holes 10 of the links 2 of the third link row 53 are so arranged in the chain width directions W as to correspond to each other, and the links 2 of the second and third link rows 52 and 53 are so connected to each other by the connecting members 50 inserted in those through holes 9 and 10 as can be bent in the chain advancing direction X.

In FIG. 3, the first to third link rows 51 to 53 are shown individually by only one, but are repeated arranged along the chain advancing direction X. Moreover, the links 2 of the two link rows adjoining each other in the chain advancing direction X are sequentially connected by the corresponding connecting members 50 thereby to form the chain 1 having the endless shape.

With reference to FIG. 3 and FIG. 4, each connecting member 50 is provided with a first pin 3 extending along the chain width directions W and acting as a first power transmission part, and a second pin 4 acting as a second power transmission part. These first and second pins 3 and 4 make a pair. The first pin 3 comes into rolling/sliding contact with the second partner pin 4 as the links 2 are bent.

In this embodiment, the connecting member 50 is provided with the first pin 4 and the second pin 4 acting as first and second power transmission parts. Alternatively, the power transmission part of the invention may be formed separately from a connecting part of the connecting member 50 for connecting the links 2 at end portions of the connecting member 50 in the chain width direction, such that the power transmission part acts only as power transmitting portions having power transmitting faces corresponding to the sheave faces.

Here, the rolling/slide contact means the contact containing at least one of the rolling contact and the sliding contact.

The first pin 3 is a long (plate-shaped) member extending in the chain width directions W. The first pin 3 has a periphery 11 extending in parallel with the chain width directions W.

This periphery 11 is formed into a smooth face having a front portion 12 acting as a confronting portion directed forward in the chain advancing direction X, a rear portion 13 acting as a back portion directed backward in the chain advancing direction X, and one end portion 14 and the other end portion 15 acting as a pair of end portions confronting each other in the chain radial direction V.

The front portion 12 confronts its partner or the second pin 4, and it makes the rolling/sliding contact at a contact portion T (or a contact point, as seen in the chain width directions W) with a later-described rear portion 19 of the second pin 4.

The one end portion 14 constitutes the end portion of the chain external diameter side in the periphery 11 of the first pin 3, and is formed into such a curve as convex toward the chain radially outer side.

The other end portion 15 constitutes the end portion on the chain inner diameter side in the periphery 11 of the first pin 3 and is formed into such a curve as convex toward the chain radially inner side.

Herein, of the chain radial direction V, the side from the one end portion 14 to the other end portion 15 is called the chain radially inner side, and the side from the other end portion 15 to the one end portion 14 is called the chain radially outer side.

A pair of end portions 16 in the longitudinal direction (or in the chain width directions W) of the first pin 3 individually protrude in the chain width directions W from the link 2 arranged at one pair of end portions in the chain width directions W. These pairing end portions 16 are individually provided with end faces 17 acting as power transmitting portions.

With reference to FIG. 2, the pairing end faces are formed in such shapes as are symmetric with respect to a center plane A. These end faces 17 are provided for frictional contacts (or engagements) with the corresponding sheave faces 62a, 63a, 72a and 73a of the individual pulleys 60 and 70.

The first pins 3 are clamped between the aforementioned corresponding sheave faces 62a, 63a, 72a and 73a thereby to transmit the power between the first pins 3 and the individual pulleys 60 and 70. The first pins 3 contact at their end faces 17 through the lubricant films with the corresponding the sheave faces 62a, 63a, 72a and 73a thereby to transmit the power. For this purpose, the first pins 3 are made of a highly strong wear-resistant material such as bearing steel (SUJ2).

With reference to FIG. 3 and FIG. 4, the second pins 4 (as also called the strips or inter-pieces) are long (or plate-shaped) members made of a material like that of the first pins 3 and extending in the chain width directions W.

The second pins 4 are made so shorter than the first pins 3 that their pairing end portions may not contact with the sheave faces of the aforementioned individual pulleys, and are arranged ahead of the pairing first pins 3 in the chain advancing direction X. In connection with the chain advancing direction X, the second pins 4 are made thinner than the first pins 3.

The periphery 18 of the second pin 4 extends in the chain width directions W. This periphery 18 is formed into a smooth face having a rear portion acting as a confronting portion directed backward in the chain advancing direction X, a front portion 20 acting as a front portion directed forward in the chain advancing direction X, and one end portion 21 and the other end portion 22 acting as a pair of end portions in the chain radial direction V.

The rear portion 19 is formed into a flat face perpendicular to the chain advancing direction X. As has been described hereinbefore, the rear portion 19 confronts the partner front portion 12 of the first pin 3.

The one end portion 21 constitutes the end portion of the chain external diameter side in the periphery 18 of the second pin 4, and is formed into such a curve as convex toward the chain radially outer side.

The other end portion 22 constitutes the end portion on the chain inner diameter side in the periphery 18 of the second pin 4 and is formed into such a curve as convex toward the chain radially inner side.

The chain 1 is made into the so-called "press-fit type" chain. Specifically, the first pin 3 is so loosely fitted in the front through hole 9 of each link as can relatively move, and the second pin 4 paired with the first pin 3 is so press-fitted in the front through hole 9 as is regulated in the relative movement. The first pin 3 is so press-fitted in the rear through hole 10 of each link 2 as is regulated in the relative movement, and the second pin 4 paired with the first pin 3 is so loosely fitted in that rear through hole 10 as can relatively move.

With the constitution thus far described, the front portion 12 of the first pin 3 and the partner rear portion 19 of the second pin 4 make the rolling/sliding contact with each other at the contact portion T, which is displaced as the bend between the links 2 adjoining in the chain advancing direction X.

As seen in the chain width directions W, the moving locus of the contact portion T draws an involute curve. Specifically, a curved portion 25 is formed at the front portion 12 of the first pin 3. The end portion of the curved portion 25 on the chain inner diameter portion is made for a predetermined start portion J (or a starting point, as viewed in the chain width directions W). The starting point J is located at a contact portion T1, i.e., at the contact portion T of the first pin 3 in the straight area of the chain 1. This starting point J is arranged closer to the chain inner diameter of the front portion 12.

As viewed in the chain width directions W, the curved portion 25 is formed of the involute curve having the predetermined starting portion J (or the starting point). A basic circle K of the involute curve has a center M and a radius Rb (or a basic circle radius of 100 mm, for example).

The center M is located in a plane perpendicular to the chain advancing direction X and containing the contact portion T1 of the first pin 3 and on the side closer to the chain inner diameter than the contact portion T1. The basic circle K is intersected with the starting portion J.

With the constitution thus far described, as seen in the chain width directions W, the curved portion 25 contacts at the contact portion T with the rear portion 19 of the partner second pin 4. The moving locus of the contact portion T accompanying the bend between the corresponding links 2 draws an involute curve with reference to the first pin 3.

Here, the curved portion 25 of the first pin 3, as viewed in the chain width directions W, may be formed into a curve (e.g., a curve having one or more radius of curvature) other than the involute curve.

This mode of embodiment is characterized in that the chain 1 is provided with an central area 26 acting as a predetermined area containing the center plane A as the center of the chain 1 with respect to the chain width directions W, and side areas 27 and 28 disposed on end and other sides with respect to the central area 26 with respect to the chain width directions W, and in that only the central area 26 contains at least two pressure contact links 2a, 2b, 2c, 2d, 2e, 2f and 2g pushed to contact with each other in the chain width directions W.

The central area 26 includes: the link 2a at the center of the aforementioned third link row 53; the links 2 (i.e., the link 2b of the second link row 52, the link 2c of the first link row 51 and the link 2d of the third link row 53) from that link 2a to the third order in one W1 of the chain width directions W; and the links 2 (i.e., the link 2e of the second link row 52, the link 2f of the first link row 51 and the link 2g of the third link row 53) from that link 2a to that of the third order in the other W2 of the chain width directions W.

In short, in this mode of embodiment, the central area 26 includes the link 2a, and the six links 2b to 2g close to that link 2a in the chain width directions W. In the central area 26, the links 2 adjoining in the chain width directions W are pushed to contact with each other.

Specifically, one side face 21a of the link 2a and one side face 21b of the link 2b make frictional contact with each other at their confronting portions. Likewise, the other side face 22b of the link 2b and one side face 21c of the link 2c make frictional contact with each other at their confronting portions. Likewise, the other side face 22c of the link 2c and one side face 21d of the link 2d make frictional contact with each other at their confronting portions.

Moreover, the other end face 22a of the link 2a and one side face 21e of the link 2e make frictional contact with each other at their confronting portions. Likewise, the other side face 22e of the link 2e and one side face 21f of the link 2f make frictional contact with each other at their confronting portions. Likewise, the other side face 22f of the link 2f and one side face 21g of the link 2g make frictional contact with each other at their confronting portions.

As a result, the link 2a makes individual frictional contacts with the corresponding links 2 on the two sides in the chain width directions W. Likewise, the links 2b, 2c, 2e and 2f make individual frictional contacts with the corresponding links 2 on the two sides in the chain width directions W.

With the constitution thus far described, the links 2, as pushed to contact with each other in the central area 26, relatively rotate (or relatively slide) while exerting frictional forces on each other, as they move from the straight area as shown in FIG. 4 to the bent area as shown in FIG. 5, namely, as the chain 1 is bent.

With reference to FIG. 3, one side area 27 includes the individual links 2 arrayed on the side of one direction W1 of the chain width directions W with respect to the central area 26. The other side area 28 includes the individual links 2 arrayed on the side of the other direction W2 of the chain width directions W with respect to the central area 26.

The individual links 2 of the individual side areas 27 and 28 are arrayed through predetermined clearances S with respect to the links 2 adjoining in the chain width directions W. The clearances S are set at such a predetermined value (e.g., about 0.04 mm) that the links 2 adjoining in the chain width directions W may not contact with each other even when the first pins 3 are clamped to slacken by the individual pulleys or when the individual pulleys make the later-described misalignment. Moreover, the aforementioned predetermined value is so set as to hold the lubricant in viscosity between the side faces of the links 2 adjoining in the chain width directions W.

Figure 6A:
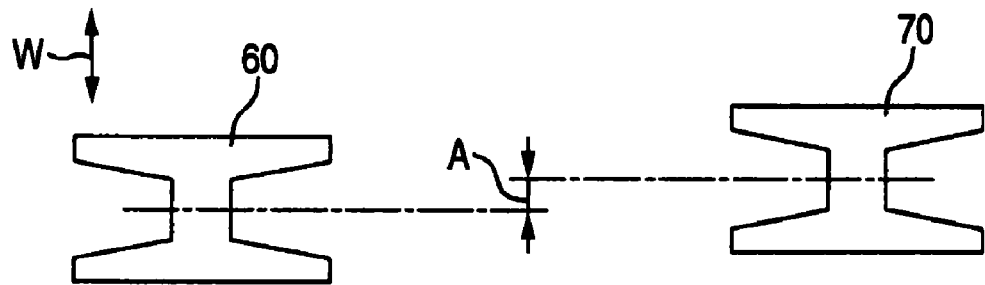
FIG. 6A to 6C are schematic diagrams for explaining individual misalignments.
Figure 6B:
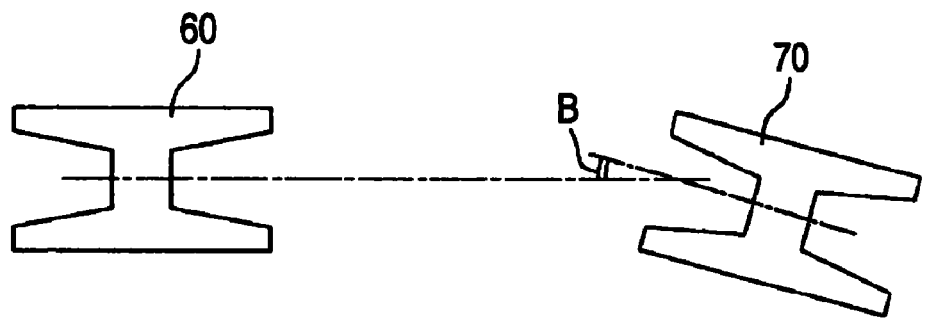
Figure 6C:
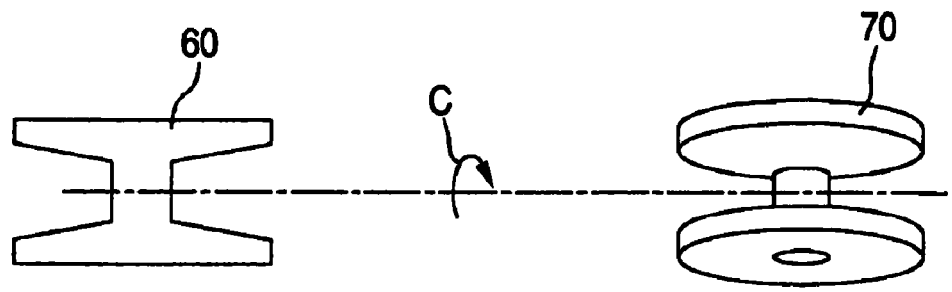

Here, the misalignment means the relative positions of the drive pulley 60 and the driven pulley 70 are offset, as shown in FIGS. 6A to 6C. This misalignment contains: a misalignment A, in which a deviation occurs in the horizontal direction (or in the chain width directions W) between the drive pulley 60 and the driven pulley 70, as shown in FIG. 6A; a misalignment B, in which the drive pulley 60 and the driven pulley 70 are rotated in directions different from each other, as shown in FIG. 6B; a misalignment C, in which the drive pulley 60 and the driven pulley 70 are twisted, as shown in FIG. 6C; and a misalignment, in which two or more of those misalignments A to C are combined.

With the constitution thus far described, as shown in FIG. 3, the links 2, as arrayed in the side areas 27 and 28 through the clearances S, rotate (or slide) relative to each other while receiving the viscous resistance (or the damping force), as the links transfer from the straight area to the bent area, that is, as the chain 1 is bent.

According to this mode of embodiment, as has been described hereinbefore, the following advantages can be attained. Specifically, the frictional resistance between the links 2 in the central area 26 acts as the damping force at the time of vibrations (or chord vibrations) of the chain 1 thereby to suppress the vibrations reliably. As a result, the first pins 3 can be prevented from impactive contact with the individual pulleys 60 and 70 thereby to improve the quietness and the durability.

On the other hand, the frictional resistance is caused only in some of the links 2 (i.e., the links 2*a* to 2*g*) so that the drive loss is small. Moreover, the first pins 3, as clamped in engagement with the individual pulleys 60 and 70, receive the pushing forces of the individual pulleys 60 and 70 from the two end portions 16, and are bent due to the misalignment or the like so that the two end portions 16 are seriously warped. However, the links 2*a* to 2*g*, as pushed to contact with each other, are disposed at the central area 26, in which the first pins 3 are less warped. As a result, it is possible to prevent the links 2*a* to 2*g* from having their relative positions accidentally fluctuated to excessively contact with each other thereby to prevent the frictional resistances between those links 2*a* to 2*g* from becoming excessively high. The drive loss can be reliably reduced to achieve high transmission efficiency.

In the side areas 27 and 38, on the other hand, the links 2 adjoining in the chain width directions W can also be reliably suppressed in the chord vibrations by the damping force of the viscous resistance of the lubricant fitted in the clearances S.

Moreover, the first pins 3 are loosely fitted and the second pins 4 are press-fitted in the corresponding front through holes 9, and the first pin 3 are press-fitted in and the second pins 4 are loosely fitted in the corresponding rear through holes 10. As a result, the links 2 are fixed in the corresponding first and second pins 3 and 4 so that they can be positioned in the chain width directions W. As a result, the corresponding links 2*a* to 2*g* of the central area 26 can be reliably pushed to contact with each other.

When the individual end faces of the individual first pins 3 come into contact with the corresponding sheave faces 62*a*, 63*a*, 72*a* and 73*a* of the individual pulleys 60 and 70, on the other hand, the pairing second pins 4 come into rolling/sliding contact with the first pins 3 so that the links 2 can be bent from each other.

At this time, the mutual rolling contact components are increased between the pairing first and second pins 3 and 4 whereas the sliding contact components are extremely decreased. As a result, the individual end faces 17 of the first pins 3 make substantially irrotational contact with the aforementioned corresponding sheave faces 62*a*, 63*a*, 72*a* and 73*a*, so that the frictional loss can be reduced to retain a higher transmission efficiency.

Moreover, the locus of the contact portion T with reference to the first pins 3 is formed to draw the involute curve, as viewed in the chain width directions W. As a result, the chord vibration can be suppressed to occur in the chain 1, when the first pins 3 are sequentially bitten by the individual pulleys 60 and 70. As a result, it is possible to further reduce the noises at the time of driving the chain 1.

Thus, it is possible to realize the continuously variable transmission 100, which is excellent in quietness, durability and transmission efficiency.

Here in this mode of embodiment, the number of the links 2 arranged at the central area 26 and pushed to contact with each other may be only two, or three or more.

On the other hand, the second pins 4 may also engage with the individual pulleys 60 and 70. Moreover, the invention can also be applied to the so-called "block type power transmission chain", in which members having power transmitting portions similar to the end faces of the first pins are arranged in the vicinities of the paired longitudinal end portions of the first pins.

On the other hand, the arrangements of the front through hole 9 and the rear through hole 10 of the link 2 may be interchanged from each other. Moreover, a communication groove (or a slit) may also be formed in the pillar portion 8 between the front through hole 9 and the rear through hole 10 of the link 2.

In this case, the elastic deformation (or the flexibility) of the link 2 can be increased by elongating the slit relatively in the chain radial direction V, thereby to reduce the stress to be established in the link 2. On the other hand, the rigidity of the link 2 can be enhanced by shortening the slit 2 relatively in the chain radial direction V.

Moreover, the invention should not be limited to the mode, in which the groove widths of the drive pulley 60 and the driven pulley 70 fluctuate, but may be modified such that only the groove width of one pulley fluctuates whereas the other groove width does not fluctuate but is fixed. On the other hand, the foregoing description is made on the mode, in which the groove width is continuously (or steplessly) fluctuated. However, the invention can also be applied to another power transmission system, the groove width is stepwise fluctuated or fixed (without any speed change).

Figure 7:
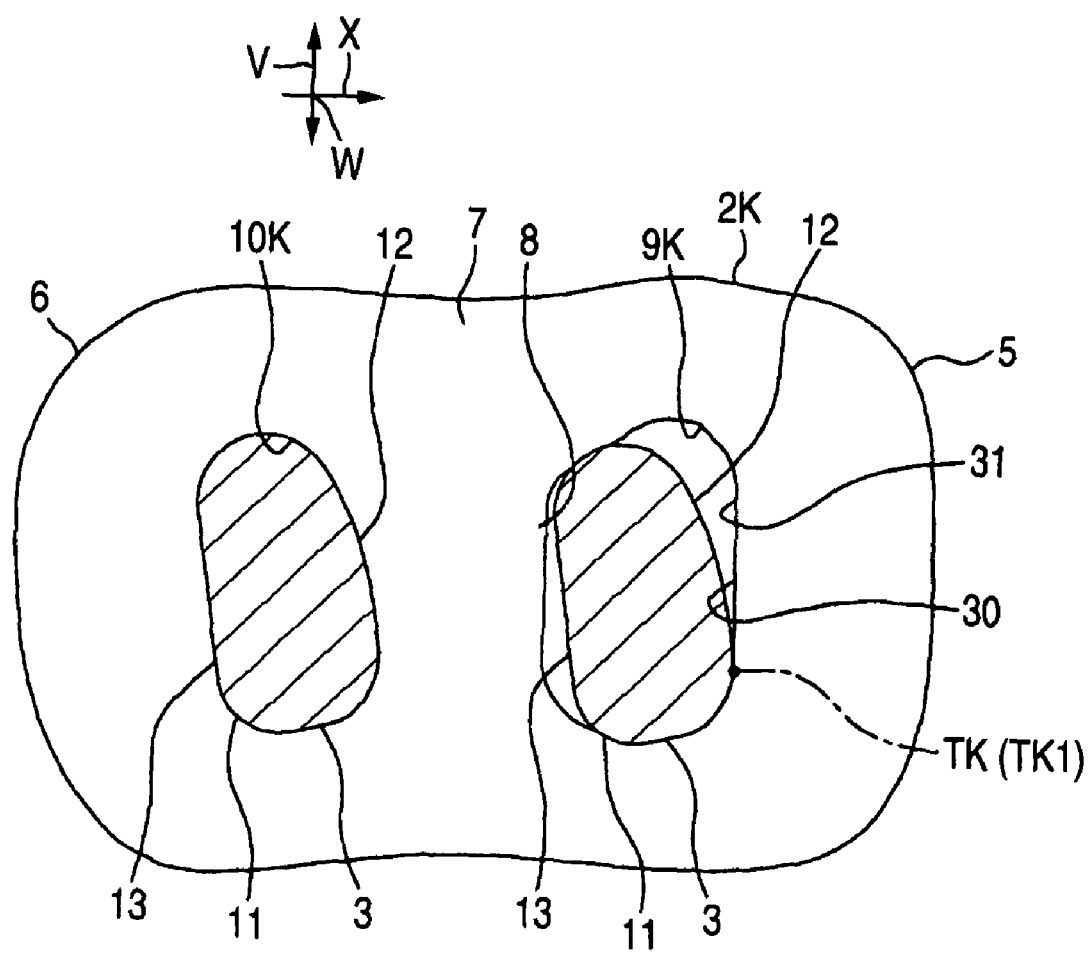
FIG. 7 is a partially sectional view of an essential portion of another mode of embodiment of the invention.

FIG. 7 is a partially sectional view of an essential portion of another mode of embodiment of the invention. Here in this mode of embodiment, the description is made mainly on the point, which is different from that of the mode of embodiment shown in FIG. 1 to FIGS. 6A to 6C, and is omitted on a similar constitution by designating similar reference numerals.

With reference to FIG. 7, this mode of embodiment is characterized in that links 2K adjoining in the chain advancing direction X are connected relatively rotatably (or bendably) by one (or single) first pin 3 acting as the connecting member. Specifically, the first pins 3 are so loosely fitted in the corresponding front through holes 9K of the individual links 2K, and the first pins 3 are so press-fitted in the corresponding through holes 10K of the individual links 2K as are regulated in the relative movements.

A front portion 31 (or a confronting portion) of the peripheral edge portion 30 of the front through hole 9K in the chain advancing direction X has a sectional shape extending in the chain radial direction V. This front portion 31 confronts the front portion 12 of the first pin loosely fitted in the front through hole 9K, and makes rolling/sliding contact at a contact portion TK. As a result, the link 2K acting as a contraposition member and the first pin 3 loosely fitted in the link 2K are brought into rolling/sliding contact with each other as the links 2K are bent.

According to this mode of embodiment, the pitch between the first pins 3 can be shortened to increase the number of the first pins 3 to be bitten at one time by the individual pulleys. As a result, the load on each of the first pins 3 can be reduced to reduce the collision force on each pulley thereby to further reduce the noises.

Although the invention has been described on some modes of embodiment, it should not be limited to the aforementioned individual modes of embodiment but can be modified in various manners within the scope of disclosure of claims.

What is claimed is:

1. A power transmission chain comprising:
   a plurality of links, comprising multiple rows of links, arranged in a chain advancing direction; and
   connecting members extending in a chain width direction perpendicular to the chain advancing direction, for connecting the plurality of links such that the links are relatively bendable to each other, the plurality of links extending from a first end of said connecting members to a second end of said connecting members,
   wherein the power transmission chain includes a first side area, a second side area, and a central area disposed between the first side area and the second side area, the central area being disposed adjacent a center of the power transmission chain in a chain width direction, the first side area extending from the central area to the first end of said connecting members, and the second side area extending from the central area to the second end of said connecting members, wherein of said plurality of links, each link disposed within the central area of the power transmission chain comprises a pressure contact link, said pressure contact links contacting with each other so as to be mutually pressed in the chain width direction so that said pressure contact in are relatively rotated while exerting a frictional force on each other as the power transmission chain is bent, and each link disposed within the first side area and the second side area is separated by a clearance, and wherein the connecting members include power transmission parts having pulley engaging power transmitting portions individually at a pair of end portions.

2. A power transmission chain according to claim 1, wherein said connecting members include a first power transmission part having a pulley engaging power transmitting portions individually at a pair of end portions, and a second power transmission part paired with the first power transmission part; and each of the links includes first and second through holes arranged in the chain advancing direction;

in one of the first and second through holes of each of the links, the corresponding first power transmission part is so fitted as can relatively move, and the corresponding second power transmission part is so fitted as is restricted in the relative movement; and in the other of the first and second through holes of each of the links, the corresponding first power transmission part is so fitted as is restricted in the relative movement, and the corresponding second power transmission part is so fitted as can relatively move.

3. A power transmission system comprising:

first and second pulleys individually including a plurality of conical sheave faces confronting each other; and a power transmission chain according to claim 1 looped between the pulleys and engaging with the sheave faces for transmitting a power.

4. The power transmission chain according to claim 1, wherein said pressure contact links comprise a central link disposed at a substantially center point of the power transmission chain with respect to the chain width direction, and wherein the central link makes frictional contact with an adjacent link on each side of the central link.

5. A power transmission chain comprising:

a plurality of links, comprising multiple rows of links, arranged in a chain advancing direction; and connecting members extending in a chain width direction perpendicular to the chain advancing direction, for connecting the plurality of links such that the links are relatively bendable to each other, the plurality of links extending from a first end of said connecting members to a second end of said connecting members, wherein the power transmission chain includes a first side area, a second side area, and a central area disposed between the first side area and the second side area, the central area being disposed adjacent a center of the power transmission chain in a chain width direction, the first side area extending from the central area to the end of said connecting members, and the second side area extending from the central area to the second end of said connecting members, wherein the connecting members include power transmission parts having pulley engaging power transmitting portions individually at a pair of end portions, wherein each of a plurality of links disposed within the central area contacts each other, and wherein each link positioned outside of the central area of the power transmission chain is separated by a clearance.

6. The power transmission chain according to claim 5, wherein the clearance is sufficient such that the links positioned outside of the central area of the power transmission chain do not contact each other.

7. The power transmission chain according to claim 5, wherein the clearance is substantially 0.04 mm.

8. A power transmission chain comprising:

a first side area, a second side area, and a central area disposed between the first side area and the second area, the central area being disposed adjacent a center of the power transmission chain in a chain width direction;

a plurality of links, comprising multiple rows of links, arranged in a chain advancing direction, of said plurality of links, each link disposed within the central area of the power transmission chain comprises a pressure contact link, said pressure contact links contacting with each other so as to be mutually pressed in the chain width direction and each link disposed with the first side area and the second side area is separated by a clearance; and connecting members for connecting the plurality of links, the plurality of links extending from a first end of said tin members second end of said connecting member, wherein the first side area extends from the central area to the first end of said connecting members, and the second side area extends from the central area to the second end of said connecting members.

9. The power transmission chain according to claim 8, wherein said pressure contact links comprise a central link disposed at a substantially center point of the power transmission chain with respect to the chain width direction, and wherein the central link makes frictional contact with an adjacent link on each side of the central link.

10. A power transmission chain comprising:

a first side area, a second side area, and a central area disposed between the first side area and the second side are, the central area being disposed adjacent a center of the power transmission chain in a chain width direction;

a plurality of links, comprising multiple rows of links, arranged in a chain advancing direction; and connecting members for connecting the plurality of links, the plurality of links extending from a first end of said connecting members to a second end of said connecting members, the first side area extending from the central area to the first end of said connecting members, and the second side area extending from the central area to the second end of said connecting members, wherein each of a plurality of links disposed within the central area contacts each other, and wherein each link positioned outside of the central area of the power transmission chain is separated by a clearance.

11. The power transmission chain according to claim 10, wherein the clearance is sufficient such that links positioned outside of the central area of the power transmission chain do not contact each other.

12. The power transmission chain according to claim 10, wherein the clearance is substantially 0.04 mm.

13. A power transmission system, comprising:
first and second pulleys individually including a plurality of conical sheave faces confronting each other; and
a power transmission chain looped between the pulleys and engaging with the sheave faces for transmitting a power, the power transmission chain comprising:
- a first side area, a second side area, and a central area disposed between the first side area and the second side area, the central area being disposed adjacent a center of the power transmission chain in a chain width direction;
- a plurality of links, comprising multiple rows of links, arranged in a chain advancing direction, of said plurality of links, each link disposed within the central area of the power transmission chain comprises a pressure contact link, said pressure contact links contacting each other so as to be mutually pressed in the chain width direction and each of links disposed within the first side area and the second area is separated by a clearance; and
- connecting members for connecting the plurality of links, said plurality of links extending from a first of said connecting members to a second of said connecting members, wherein the first side area extends from the central area to the first end of said connecting members, and the second side area extends from the central area to the second end of said connecting members.

14. The power transmission system according to claim 13, wherein said pressure contact links comprise a central link disposed at a substantially center point of the power transmission chain with respect to the chain width direction, and
wherein the central link makes frictional contact with an adjacent link on each side of the central link.

15. A power transmission system, comprising:
first and second pulleys individually including a plurality of conical sheave faces confronting each other; and
a power transmission chain looped between the pulleys and engaging with the sheave faces for transmitting a power, the power transmission chain comprising:
- a first side area, a second side area, and a central area disposed between the first side area and the second side area, the central area being disposed adjacent a center of the power transmission chain in a chain width direction;
- a plurality of links, comprising multiple rows of links, arranged in a chain advancing direction; and
- connecting members for connecting the plurality of links, said plurality of links extending from a first of said connecting members to a second of said connecting members, the first side area extending from the central area to the first end of said connecting members, and the second side area extending from the central area to the second end of said connecting members, wherein each link disposed within the central area contacts each other, and
wherein each link positioned outside of the central area of the power transmission chain is separated by a clearance.

16. The power transmission system according to claim 15, wherein the clearance is sufficient such that the links positioned outside of the central area of the power transmission chain do not contact each other.

17. The power transmission system according to claim 15, wherein the clearance is substantially 0.04 mm.

* * * * *